United States Patent
Austin et al.

(10) Patent No.: US 10,766,412 B1
(45) Date of Patent: Sep. 8, 2020

(54) SYSTEMS AND METHODS FOR NOTIFYING OTHER ROAD USERS OF A CHANGE IN VEHICLE SPEED

(71) Applicant: Toyota Motor Engineering & Manufacturing North America, Inc., Plano, TX (US)

(72) Inventors: Benjamin P. Austin, Saline, MI (US); Joshua E. Domeyer, Madison, WI (US); John K. Lenneman, Okemos, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/569,052

(22) Filed: Sep. 12, 2019

(51) Int. Cl.
| | | |
|---|---|---|
| *B60Q 1/50* | (2006.01) | |
| *B60Q 1/54* | (2006.01) | |
| *G08G 1/01* | (2006.01) | |
| *B60Q 5/00* | (2006.01) | |

(52) U.S. Cl.
CPC ............... *B60Q 1/54* (2013.01); *B60Q 5/005* (2013.01); *G08G 1/0125* (2013.01)

(58) Field of Classification Search
None
See application file for complete search history.

(56) References Cited

U.S. PATENT DOCUMENTS

| | | | |
|---|---|---|---|
| 5,432,509 A * | 7/1995 | Kajiwara | G01S 13/931 340/903 |
| 8,954,252 B1 | 2/2015 | Urmson et al. | |
| 9,804,599 B2 | 10/2017 | Kentley-Kay et al. | |
| 9,969,326 B2 | 5/2018 | Ross et al. | |
| 10,160,378 B2 | 12/2018 | Sweeney et al. | |
| 10,308,246 B1 | 6/2019 | Konrardy et al. | |
| 2011/0169625 A1 * | 7/2011 | James | B60Q 9/008 340/439 |
| 2015/0091740 A1 * | 4/2015 | Bai | G08B 21/06 340/901 |

(Continued)

FOREIGN PATENT DOCUMENTS

GB        2531084 A        4/2016

OTHER PUBLICATIONS

Schlack et al., "Speed perception during acceleration and deceleration", Journal of Vision Jun. 2008, vol. 8, 9. doi:10.1167/8.8.9 (in 11 pages).

(Continued)

*Primary Examiner* — Brent Swarthout

(74) *Attorney, Agent, or Firm* — Christopher G. Darrow; Darrow Mustafa PC

(57) ABSTRACT

Systems and methods for notifying other road users of a change in speed of a vehicle are disclosed herein. One embodiment receives sensor data from one or more sensors; detects, from the sensor data, one or more other road users; determines a lag time, relative to a commencement of the change in speed of the vehicle, that coincides with an estimated moment at which at least one of the one or more other road users perceives the change in speed of the vehicle; and outputs a signal from the vehicle in accordance with the lag time to notify the at least one of the one or more other road users of the change in speed of the vehicle.

17 Claims, 5 Drawing Sheets

(56) References Cited

U.S. PATENT DOCUMENTS

| | | | |
|---|---|---|---|
| 2015/0197196 A1* | 7/2015 | Lin | B60Q 9/008 340/436 |
| 2015/0268665 A1 | 9/2015 | Ludwick et al. | |
| 2016/0179094 A1 | 6/2016 | Sorokin et al. | |
| 2017/0210285 A1* | 7/2017 | Kobayashi | B60Q 1/50 |
| 2018/0190120 A1* | 7/2018 | Kim | B60W 30/0953 |
| 2018/0276986 A1 | 9/2018 | Delp | |

OTHER PUBLICATIONS

Cohen et al., "The Risk Taken in Crossing a Road", Operational Research Society, vol. 6, No. 3 (Sep. 1955) (in 9 pages).

Liu et al., "Risk analysis of pedestrians' road-crossing decisions: Effects of age, time gap, time of day, and vehicle speed", Safety Science 63, 77-82 (2013) (in 6 pages).

Sucha et al., "Pedestrian-driver communication and decision strategies at marked crossings", Accident Analysis and Prevention 102, 41-50 (2017) (in 10 pages).

Katz et al., "An Experimental Study of Driver and Pedestrian Interaction During the Crossing Conflict", Human Factors, 17(5), 514-527. doi:10.1177/001872087501700510 (1975) (in 14 pages).

Scialfa et al., "Age Differences in Estimating Vehicle Velocity", Psychology and Aging, vol. 6, No. 1, 60-66 (1991) (in 7 pages).

Moore, "Pedestrian Choice and Judgment", Men and Machines in Transport Systems, OR, 4(1), 3. doi:10.2307/3006905 (1953) (in 8 pages).

Beggiato et al., "The Right Moment for Braking as Informal Communication Signal Between Automated Vehicles and Pedestrians in Crossing Situations," Advances in Human Aspects of Transportation, Springer International Publishing AG, 2018, pp. 1072-1081.

Hancock, et al. "Time-to-contact: more than tau alone", Ecological Psychology, 9(4), 265-297. doi:10.1207/s15326969eco0904 (1997).

Petzoldt, "On the relationship between pedestrian gap acceptance and time to arrival estimates", Accident Analysis & Prevention, 72, 127-133. doi:10.1016/j.aap.2014.06.019 (2014).

Caird, et al. "The perception of arrival time for different oncoming vehicles at an intersection", Ecological Psychology, 6(2), 83-109. doi:10.1207/s15326969eco0602_1 (1994).

* cited by examiner

SYSTEMS AND METHODS FOR NOTIFYING OTHER ROAD USERS OF A CHANGE IN VEHICLE SPEED

TECHNICAL FIELD

The subject matter described herein generally relates to vehicles and, more particularly, to systems and methods for notifying other road users such as pedestrians and cyclists of a change in a vehicle's speed.

BACKGROUND

When the paths of a motorized vehicle and an other road user such as a pedestrian or cyclist cross, the other road user often must decide whether to cross in front of the approaching vehicle. This decision may involve the other road user observing the approaching vehicle to gauge its speed and whether it is maintaining an approximately constant speed, accelerating, or decelerating. Based on those observations, the other road user can decide whether there is sufficient time for the other road user to cross safely.

A vehicle can output a signal of some kind to indicate to an other road user that the vehicle is about to accelerate or decelerate to assist the other road user in deciding whether to cross or wait. Such a signal can be particularly helpful in the case of an approaching autonomous vehicle, in which there might not be an attentive human occupant to gesture to the other road user. However, other road users might hesitate to trust such a signal from an autonomous vehicle.

SUMMARY

An example of a system for notifying other road users of a change in vehicle speed is presented herein. The system comprises one or more sensors to output sensor data, a signaling subsystem, one or more processors, and a memory communicably coupled to the one or more processors. The memory stores a detection module including instructions that when executed by the one or more processors cause the one or more processors to detect, from the sensor data, one or more other road users. The memory also stores a perception module including instructions that when executed by the one or more processors cause the one or more processors to determine a lag time, relative to a commencement of the change in speed of the vehicle, that coincides with an estimated moment at which at least one of the one or more other road users perceives the change in speed of the vehicle. The memory also stores a signaling module including instructions that when executed by the one or more processors cause the one or more processors to output a signal from the signaling subsystem in accordance with the lag time to notify the at least one of the one or more other road users of the change in speed of the vehicle.

Another embodiment is a non-transitory computer-readable medium for notifying other road users of a change in speed of a vehicle and storing instructions that when executed by one or more processors cause the one or more processors to receive sensor data from one or more sensors. The instructions also cause the one or more processors to detect, from the sensor data, one or more other road users. The instructions also cause the one or more processors to determine a lag time, relative to a commencement of the change in speed of the vehicle, that coincides with an estimated moment at which at least one of the one or more other road users perceives the change in speed of the vehicle. The instructions also cause the one or more processors to output a signal from the vehicle in accordance with the lag time to notify the at least one of the one or more other road users of the change in speed of the vehicle.

In another embodiment, a method of notifying other road users of a change in speed of a vehicle is disclosed. The method comprises receiving sensor data from one or more sensors. The method also includes detecting, from the sensor data, one or more other road users. The method also includes determining a lag time, relative to a commencement of the change in speed of the vehicle, that coincides with an estimated moment at which at least one of the one or more other road users perceives the change in speed of the vehicle. The method also includes outputting a signal from the vehicle in accordance with the lag time to notify the at least one of the one or more other road users of the change in speed of the vehicle.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

One weakness of some conventional systems for signaling the intentions of a vehicle (e.g., an autonomous vehicle) to an other road user such as a pedestrian or cyclist is that the signal is output at the moment the vehicle begins to accelerate or decelerate, or the signal is output in advance (e.g., several seconds beforehand) as a warning. Some research has demonstrated that an other road user ("ORU") does not perceive a change in speed of an approaching vehicle until after a predictable delay or "lag time" that depends on factors such as the initial speed of the vehicle immediately prior to the change in speed and the length of time that the other road user has been visually fixating on (i.e., looking at) the vehicle during a period immediately preceding the change in speed. When a signal from an approaching vehicle (e.g., lights and/or audible sounds) does not coincide with the moment at which the other road user perceives the change in speed, it can cause the other road user not to trust the signal. This lack of trust is one example of the challenges facing the automotive industry as it attempts to introduce autonomous vehicles on roadways.

Various embodiments described herein overcome the weaknesses of conventional notification systems by determining the lag time, relative to the commencement of a change in speed of a vehicle, that coincides with the estimated moment at which an other road user will perceive the change in speed. A signal can then be output from the vehicle in accordance with the calculated lag time so that the other road user receives the signal at approximately the same instant at which the other road user perceives the approaching vehicle's change in speed. The signal coinciding in time with the other road user's perception can increase the other road user's trust of the signal indicating the change in speed. This can consequently increase the other road user's trust in autonomous vehicles generally.

Figure 1:
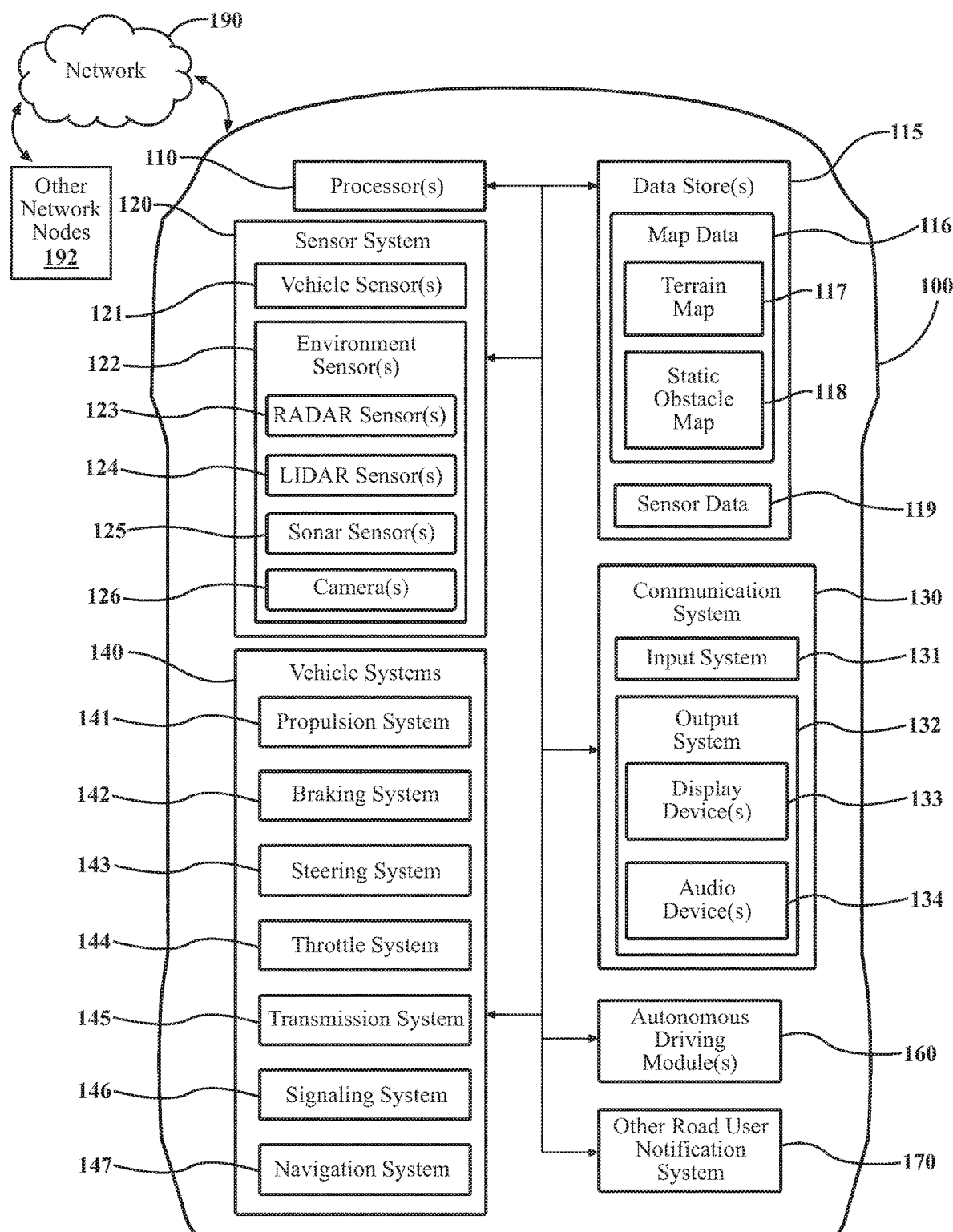
FIG. 1 illustrates one embodiment of a vehicle within which systems and methods disclosed herein may be implemented.

Referring to FIG. 1, an example of a vehicle 100, in which systems and methods disclosed herein can be implemented, is illustrated. The vehicle 100 can include an other road user (ORU) notification system 170 or components and/or modules thereof. As used herein, an "other road user" or "ORU" is any person who is capable of moving along or across a roadway. Examples include, without limitation, a pedestrian, a cyclist, the occupant of a wheelchair, and the driver or other occupant of another vehicle. In some embodiments described herein, pedestrians and cyclists are of particular interest.

As used herein, a "vehicle" is any form of motorized transport. In one or more implementations, the vehicle 100 can be an automobile. In some implementations, the vehicle 100 may be any other form of motorized transport. In some embodiments, vehicle 100 is capable of operating in a semi-autonomous or fully autonomous mode. The vehicle 100 can include the ORU notification system 170 or capabilities to support or interact with the ORU notification system 170 and thus benefits from the functionality discussed herein. While arrangements will be described herein with respect to automobiles, it will be understood that implementations are not limited to automobiles. Instead, implementations of the principles discussed herein can be applied to any kind of vehicle. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including ORU notification system 170. While the various elements are shown as being located within the vehicle 100 in FIG. 1, it will be understood that one or more of these elements can be located external to the vehicle 100. Further, the elements shown may be physically separated by large distances. As shown in FIG. 1, vehicle 100 may communicate with other network nodes 192 (e.g., other vehicles, servers, roadside infrastructure, etc.) via network 190.

Some of the possible elements of the vehicle 100 are shown in FIG. 1 and will be described in connection with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Figure 2:
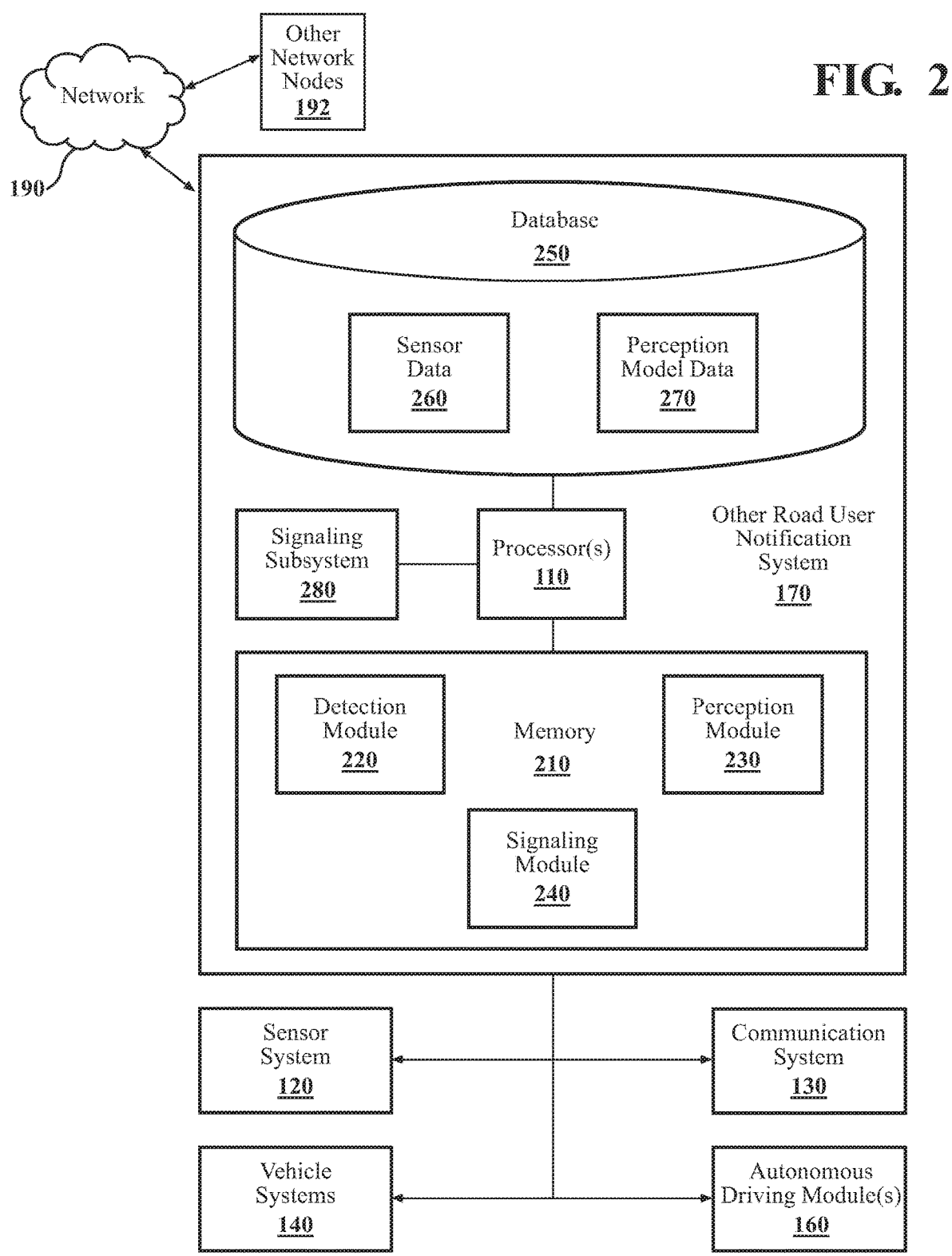
FIG. 2 illustrates one embodiment of an other road user notification system.

Referring to FIG. 2, one embodiment of the ORU notification system 170 of FIG. 1 is further illustrated. In this particular embodiment, ORU notification system 170 is shown as including one or more processors 110 from the vehicle 100 of FIG. 1. In general, the one or more processors 110 may be a part of ORU notification system 170, ORU notification system 170 may include one or more separate processors from the one or more processors 110 of the vehicle 100, or ORU notification system 170 may access the one or more processors 110 through a data bus or another communication path, depending on the embodiment.

In one embodiment, memory 210 stores a detection module 220, a perception module 230, and a signaling module 240. The memory 210 is a random-access memory (RAM), read-only memory (ROM), a hard-disk drive, a flash memory, or other suitable memory for storing the modules 220, 230, and 240. The modules 220, 230, and 240 are, for example, computer-readable instructions that when executed by the one or more processors 110, cause the one or more processors 110 to perform the various functions disclosed herein.

As shown in FIG. 2, ORU notification system 170 can communicate with other network nodes 192 (e.g., other vehicles, servers, roadside infrastructure, etc.) via network 190. In some embodiments, ORU notification system 170 can also communicate with various vehicle systems 140, communication system 130, and autonomous driving module(s) 160 (refer to FIG. 1).

In various embodiments, ORU notification system 170 receives a variety of sensor data from sensors of different types. For example, ORU notification system 170 can receive sensor data from, without limitation, one or more image sensors (e.g., cameras), Light Detection and Ranging (LIDAR) sensors, sonar sensors, and radar sensors. In some embodiments, ORU notification system 170 receives sensor data from sensor system 120 of vehicle 100 (refer to FIG. 1). In other embodiments, ORU notification system 170 can receive, via network 190, sensor data from one or more connected vehicles, from devices associated with one or more ORUs (e.g., smartphones, smartwatches), from roadside infrastructure, or a combination thereof. The sensor data that ORU notification system 170 receives and analyzes can be stored as sensor data 260 in database 250.

Detection module 220 generally includes instructions that cause the one or more processors 110 to detect, from the received sensor data, one or more ORUs in the environment ahead of vehicle 100. In detecting ORUs, detection module 220 can employ principles of machine vision that are applied to object detection/recognition. These techniques can include, in some embodiments, semantic segmentation, instance segmentation, and machine learning. In some situations, detection module 220 identifies only one ORU. In other situations, detection module 220 might identify multiple ORUs at approximately the same time (e.g., two pedestrians preparing to cross the roadway ahead at a crosswalk).

In some embodiments, detection module 220 can measure a detected ORU's gaze patterns (i.e., where the ORU is looking) by analyzing sensor data (e.g., image and/or LIDAR data). In some embodiments, vehicle 100 includes long-range sensors that are designed for eye/gaze tracking. By analyzing sensor data, detection module 220 can determine in what direction an ORU is looking over time— specifically whether the ORU is gazing along a trajectory that intersects with the volume of vehicle 100 and, if so, for how long. In other words, detection module 220 can determine for how long a period, if any, an ORU has been looking at vehicle 100 during a period immediately preceding the change in speed of vehicle 100. In some embodiments, perception module 230 can use the gaze-pattern data in conjunction with other factors such as the initial speed of vehicle 100 to compute the lag time, as discussed further below. If detection module 220 determines that an ORU was not looking at vehicle 100 prior to the change in speed, perception module 230 can, in some embodiments, determine the lag time based solely on the initial speed of vehicle 100 immediately prior to the change in speed.

In some embodiments, detection module 220 is configured to classify detected ORUs in greater detail. As discussed further below, perception module 230 can use this information to refine its estimate of the lag time. For example, in some embodiments, detection module 220 can determine or estimate the age of an ORU. In some embodiments, detection module 220 can explicitly receive an ORU's age from a device (e.g., a smartphone or smartwatch) associated with the ORU, if the ORU has opted to share such information with ORU notification system 170 for safety purposes. In other embodiments, detection module 220 can estimate a person's age by analyzing the ORU's appearance, posture, and/or gait from sensor data (images, video, etc.). A person's age can affect the ORU's rate of perception (research demonstrates that older people tend to require more time to perceive a change in speed of an approaching vehicle than younger people).

In another embodiment, detection module 220 can estimate the current emotional state of a detected ORU by analyzing the ORU's facial expressions, posture, gait, and/or biometric data (pulse, etc.). Such biometric data can, in some embodiments, be obtained from a device (e.g., a smartphone or smartwatch) associated with the ORU, if the ORU has opted to share such data with ORU notification system 170 for safety purposes. A person's emotional state can also affect the time required for an ORU to perceive a change in speed of an approaching vehicle (research demonstrates that those in a negative or depressed mood tend to require more time to perceive the speed change than those in a more positive mood).

As discussed below, another factor that perception module 230 can take into account in determining a lag time for perception, in some embodiments, is the speed at which an ORU is moving. In connection with detecting an ORU, detection module 220 can, in some embodiments, measure an ORU's speed by analyzing sensor data (e.g., successive frames of video) from sensor system 120 of vehicle 100, by analyzing sensor data or speed measurements received via network 190 from one or more connected vehicles in the vicinity of the ORU, by receiving via network 190 sensor data or explicit speed measurements from a device (e.g., a smartphone or smartwatch) associated with the ORU, or by a combination of these techniques. Once the speed of an ORU has been determined, detection module 220 can determine the relative speed between vehicle 100 and the ORU. Perception module 230 can then use the relative speed obtained by detection module 220 as an input in computing the lag time.

Perception module 230 generally includes instructions that cause the one or more processors 110 to determine a lag time or delay, relative to the commencement of a change in speed of the vehicle 100, that coincides with an estimated moment at which at least one of one or more detected other road users perceives the change in speed of vehicle 100. The estimated moment after a vehicle's change in speed at which an ORU will perceive the change in speed can be determined based on empirical perception-model data (e.g., data gathered from tests or experiments that measure the time required for perception under different circumstances). The results of such tests and experiments have been published, as those skilled in the art are aware. Data pertaining to human perception can, in some embodiments, be stored as perception model data 270 in database 250. Perception module 230 can use perception model data 270 in computing a lag time for the outputting of a signal to notify an ORU of a change in speed of vehicle 100, as discussed further below.

Two examples of factors that perception module 230 can take into account in estimating the lag time are (1) the initial speed of vehicle 100 immediately prior to the commencement of a change in speed and (2) the length of time that an ORU has been visually fixating on (looking at) vehicle 100 during a period immediately preceding the change in speed. Examples of curves plotting perception time versus initial vehicle speed and fixation time are illustrated in, respectively, FIGS. 3A and 3B.

Figure 3A:
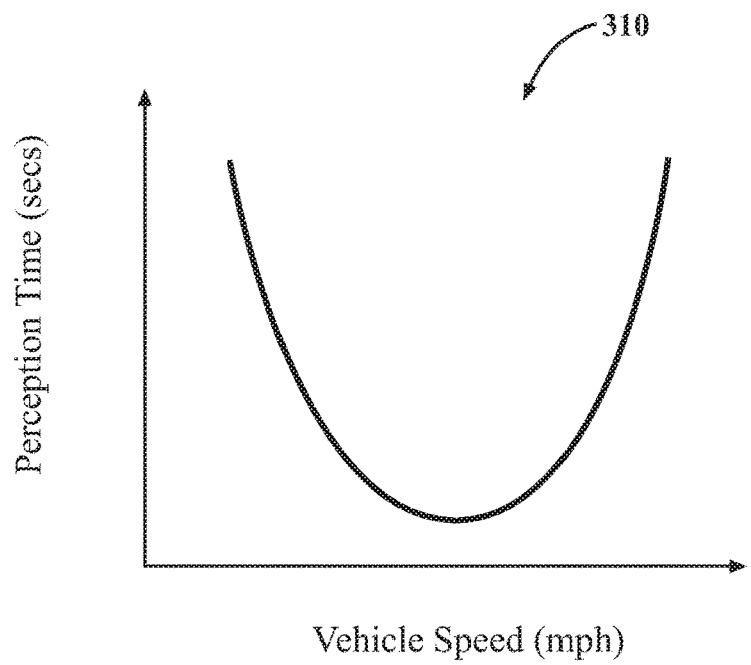
FIG. 3A is a graph illustrating a relationship between initial vehicle speed and the time it takes an other road user to perceive a change in speed of the vehicle, in accordance with an illustrative embodiment of the invention.

FIG. 3A is a graph illustrating a relationship between initial vehicle speed and the time it takes an ORU to perceive a change in speed of the vehicle, in accordance with an illustrative embodiment of the invention. As indicated in FIG. 3A, ORUs require more time to perceive a change in speed when the initial speed of the vehicle is extremely fast or extremely slow. In between those extremes, the perception time is shorter in accordance with a predictable relationship. Perception module 230 can determine the initial speed of vehicle 100 from the vehicle's own on-board speed measurement apparatus (e.g., a speedometer) or from a speed measurement that is transmitted to vehicle 100 from an infrastructure sensor device, depending on the particular embodiment.

Figure 3B:
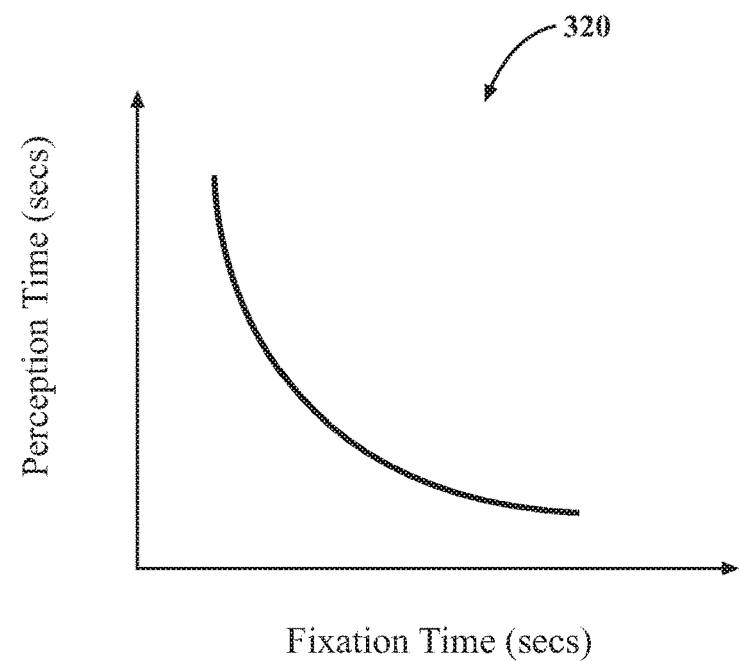
FIG. 3B is a graph illustrating a relationship between other-road-user visual-fixation time and the time it takes an other road user to perceive a change in speed of a vehicle, in accordance with an illustrative embodiment of the invention.

FIG. 3B is a graph illustrating a relationship between ORU visual-fixation time and the time it takes an ORU to perceive a change in speed of a vehicle, in accordance with an illustrative embodiment of the invention. As indicated in FIG. 3B, an ORU's perception time decreases as gaze or fixation time increases. As discussed above, detection module 220 can measure gaze patterns of ORUs, and perception module 230 can use that gaze-pattern data in estimating the lag time.

Initial vehicle speed and gaze-pattern data can be combined in different ways to compute the lag time, depending on the embodiment. In some embodiments, a range of possible perception times is first determined based on the initial vehicle speed, and the lag time can then be "fine tuned" within that range based on other factors such as an ORU's measured gaze patterns. For example, if an ORU is determined to have been gazing at a vehicle 100 before vehicle 100 changes speed (accelerates or decelerates), the lag time can be shortened within the range of perception times initially determined from the initial vehicle speed. Depending on the embodiment, additional factors beyond initial vehicle speed and measured ORU gaze patterns can also be taken into account in determining the lag time. Those other factors include, without limitation, the speed at which an ORU is moving, the age of an ORU, and the emotional state of an ORU.

Situations can arise in which multiple ORUs are detected at approximately the same time, and some of the ORUs are looking at vehicle 100, but others are not. In a case in which none of the detected ORUs is looking at vehicle 100, perception module 230 can determine the lag time based solely on the initial speed of vehicle 100 just prior to the change in speed (e.g., by choosing an average within the lag-time range associated with the initial speed of vehicle 100). If more than one detected ORU is determined to be gazing at vehicle 100, the gaze-pattern measurements of the plurality of ORUs from detection module 220 can be averaged or otherwise weighted or combined. If only one of a plurality of detected ORUs is determined to be gazing at vehicle 100, the gaze-pattern data for that single ORU can be used in the calculations.

As mentioned above, examples of other factors that perception module 230 can take into account in determining the lag time are the known or estimated age of a detected ORU and the estimated emotional state of an ORU. As discussed above, in some embodiments, detection module 220 acquires age-related data, emotional-state-related data, or both for detected ORUs, and that information can be fed to perception module 230 for use in determining the lag time. As mentioned above in connection with analyzing ORU gaze patterns, considerations such as age and emotional state can be viewed as another way to fine tune the computation of lag time within a possible range of perception times corresponding to the initial speed of vehicle 100. For example, advanced age or a detected depressed mood could be the basis for increasing the estimated lag time within the expected range. Likewise, youth or a detected cheerful mood could be the basis for decreasing the lag time within the expected range.

Signaling module 240 generally includes instructions that cause the one or more processors 110 to output a signal from signaling subsystem 280 in accordance with the lag time to notify at least one of one or more detected ORUs of a change in speed (acceleration or deceleration) of vehicle 100. That is, the signal is timed (intentionally delayed relative to the commencement of the speed change) to coincide as closely as possible with the moment at which a detected ORU will perceive the change in speed by watching vehicle 100 as it approaches. The signal can be output in a manner that enables the detected ORU to perceive it (e.g., see and/or hear it).

The signal output from signaling subsystem 280 can take on a wide variety of forms, depending on the embodiment. For example, signaling subsystem 280 can include one or more lights. When deployed, the lights can be solid, flashing/blinking, animated (e.g., a moving pattern of lights), colored, or a combination of these characteristics. In one embodiment employing solid lights, signaling subsystem 280 includes a green light at the top of the windshield of vehicle 100 that signaling module 240 activates to indicate acceleration and a red light at the same or a similar location that signaling module 240 activates to indicate deceleration. These color choices are arbitrary and can be swapped or otherwise modified, in other embodiments. In a different embodiment in which signaling subsystem 280 employs flashing/blinking lights, a rapidly flashing light at the top of the windshield of vehicle 100 indicates acceleration, and a slowly flashing light in the same or a similar location indicates deceleration. In yet another embodiment, signaling subsystem 280 includes a strip of LED lights along the top of the windshield of vehicle 100 that signaling module 240 uses to create animated patterns of lights. For example, for acceleration, signaling module 240 can activate the lights in succession along the strip beginning at the center and moving outward in opposite directions. For deceleration, signaling module 240 can activate the lights in an opposite outward-edges-toward-the-center pattern.

The above examples are only a few of the possible implementations of signaling subsystem 280 and the notification signal. In some embodiments, signaling subsystem 280 includes one or more devices that produce audible sounds, and the signal output under control of signaling module 240 can include any of a variety of audible sounds (e.g., tones, chimes, beeps, recorded spoken messages, etc.) alone or in combination with visual indicators such as lights. In general, in some embodiments, signaling module 240 can output one version of the signal when the change in speed is acceleration and a second version of the signal that is different from the first version, when the change in speed is deceleration. Whatever the signals happen to be in a particular embodiment, it is advantageous for the signals to be logical or intuitive to an ORU (e.g., to naturally suggest acceleration or deceleration, whichever the case may be, to an ORU's mind).

Figure 4:
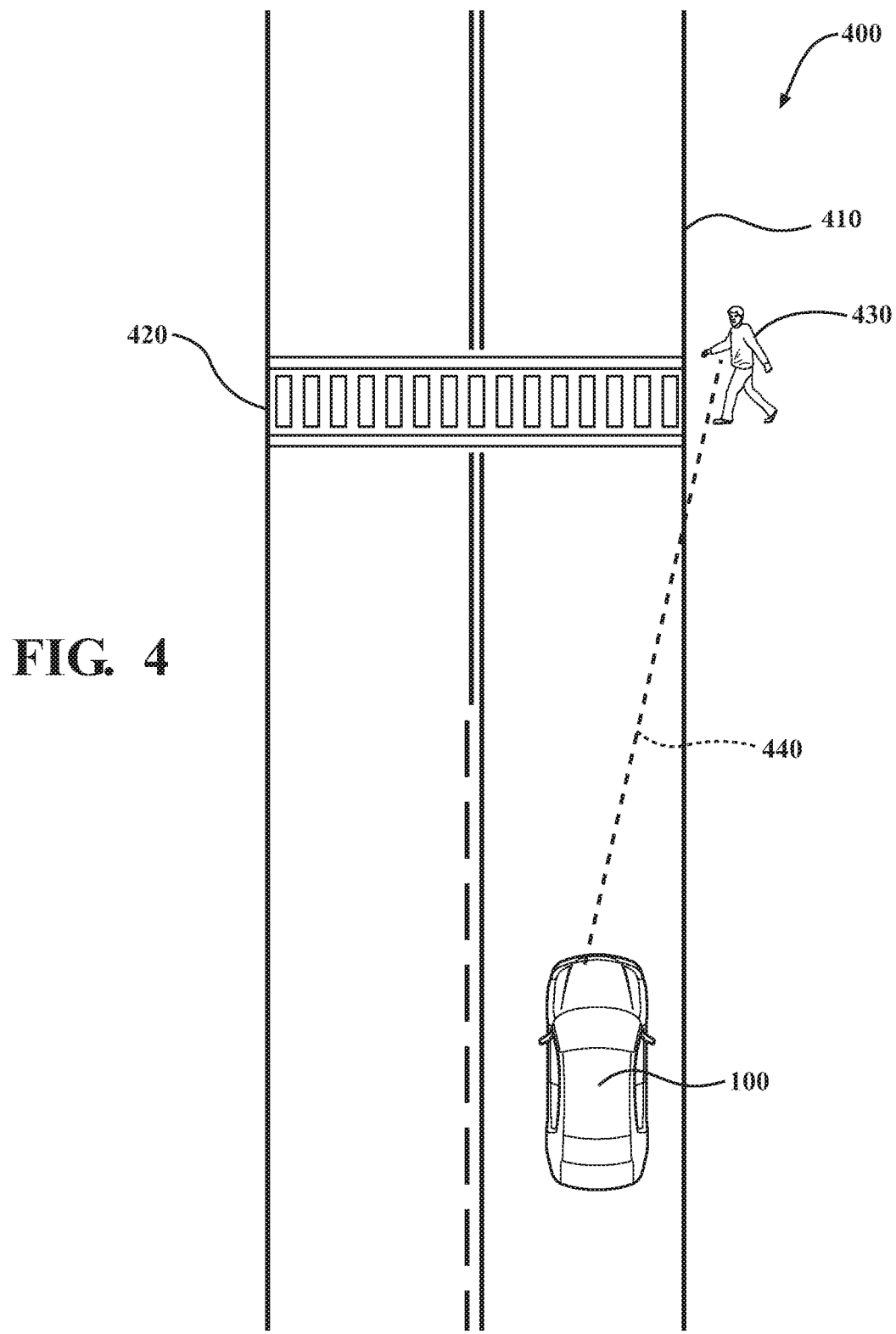
FIG. 4 illustrates an environment in which embodiments of the invention can be deployed.

FIG. 4 illustrates a roadway environment 400 in which embodiments of the invention can be deployed. In the example of FIG. 4, vehicle 100 is traveling along roadway 410. An ORU 430 (in this case, a pedestrian) is about to cross roadway 410 in crosswalk 420 as vehicle 100 approaches. As discussed above, detection module 220 detects the presence of ORU 430. Depending on the embodiment, detection module 220 can measure and analyze a gaze pattern 440 of ORU 430. For example, detection module 220 can determine the duration of a time period during which ORU 430 is looking at vehicle 100 immediately prior to a change in speed of vehicle 100. In some embodiments, detection module 220 can determine or estimate the age of ORU 430, estimate the emotional state of ORU 430, or both, as discussed above. In some embodiments, detection module 220 can determine the speed at which ORU 430 is moving, if ORU 430 is in motion, as discussed above.

Using input data such as the initial speed of vehicle 100 immediately prior to commencement of a change in speed, the measured gaze patterns of ORU 430, the speed at which ORU 430 is moving, the determined or estimated age of ORU 430, and the estimated emotional state of ORU 430, perception module 230 can determine a lag time, relative to the commencement of a change in speed of vehicle 100, that coincides with the estimated moment at which ORU 430 will perceive the change in speed of vehicle 100. As discussed above, in some embodiments, perception module 230 takes only a subset of these various factors into account in computing the lag time in accordance with a perception model and perception model data 270. For example, some embodiments emphasize the initial speed of vehicle 100 and the measured gaze patterns of ORU 430 in computing the lag time. Signaling module 240 outputs a signal from signaling subsystem 280 in accordance with the lag time to notify ORU 430 of the change in speed of vehicle 100.

The roadway environment 400 depicted in FIG. 4 is only one example of an environment in which embodiments of the invention can be deployed. Embodiments can be deployed in a variety of other situations in which vehicles and ORUs interact. Examples include, without limitation, crosswalks at intersections, crosswalks at locations other than intersections (the scenario depicted in FIG. 4), and parking lots.

Figure 5:
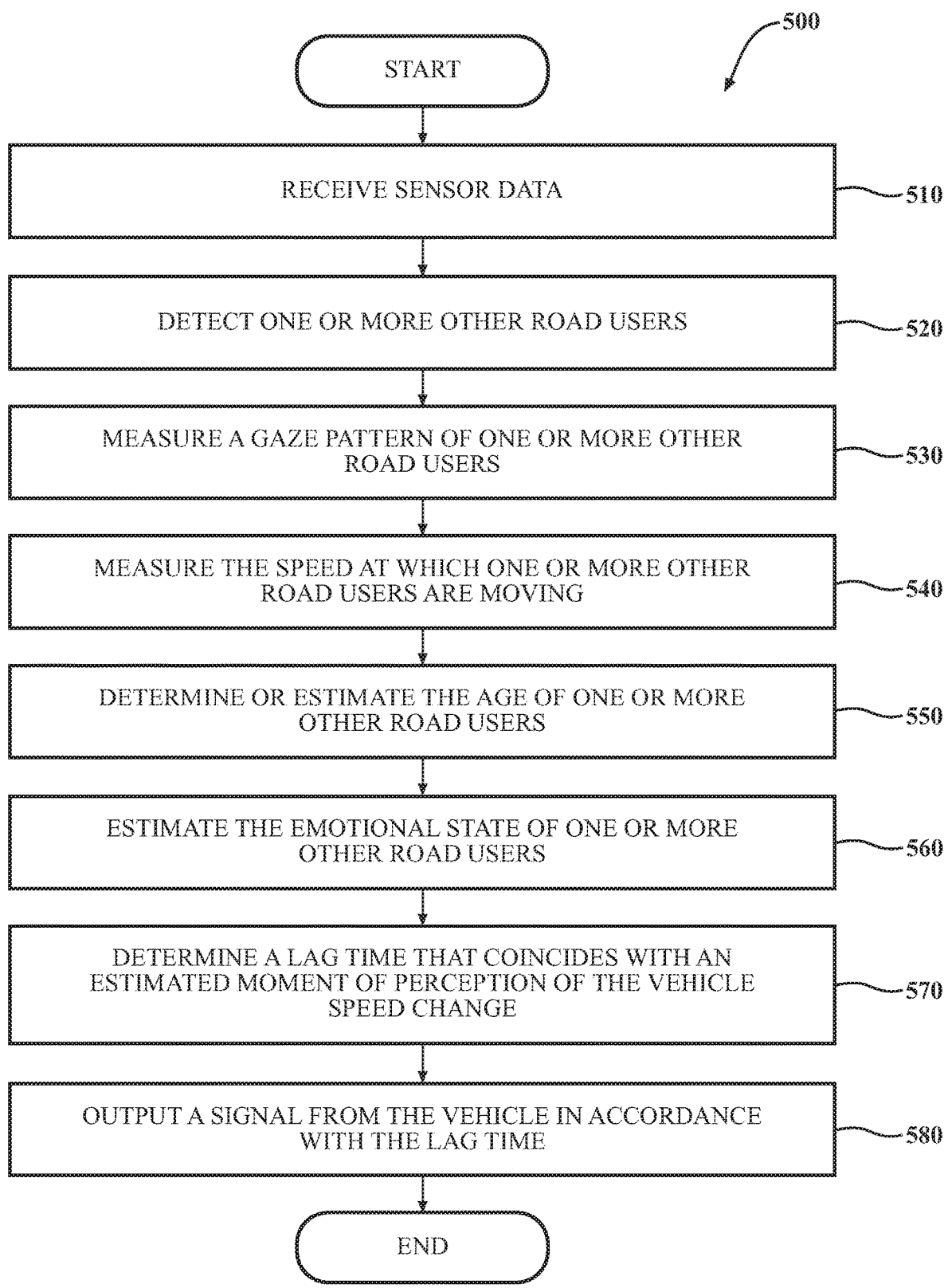
FIG. 5 is a flowchart of a method of notifying other road users of a change in speed of a vehicle, in accordance with an illustrative embodiment of the invention.

FIG. 5 is a flowchart of a method 500 of notifying other road users of a change in speed of a vehicle 100, in accordance with an illustrative embodiment of the invention. Method 500 will be discussed from the perspective of ORU notification system 170 in FIG. 2. While method 500 is discussed in combination with ORU notification system 170, it should be appreciated that method 500 is not limited to being implemented within ORU notification system 170, but ORU notification system 170 is instead one example of a system that may implement method 500. Note that blocks 530, 540, 550, and 560 are not necessarily present in every embodiment. A variety of different embodiments are possible in which some or all of those features are combined in various ways.

At block 510, ORU notification system 170 receives sensor data from one or more sensors. As discussed above, in some embodiments, ORU notification system 170 receives sensor data from sensor system 120 of vehicle 100 (refer to FIG. 1). In other embodiments, ORU notification system 170 can receive, via network 190, additional sensor data from one or more connected vehicles, from devices associated with one or more ORUs, from roadside infrastructure, or a combination thereof.

At block 520, detection module 220 detects, from the received sensor data, one or more ORUs. As discussed above, in detecting ORUs, detection module 220 can employ principles of machine vision that are applied to object detection/recognition. These techniques can include, in some embodiments, semantic segmentation, instance segmentation, and machine learning. In some situations, detection module 220 identifies only one ORU. In other situations, detection module 220 might identify multiple ORUs at approximately the same time (e.g., two pedestrians preparing to cross the roadway ahead at a crosswalk).

At block 530, detection module 220 measures, from the received sensor data, a gaze pattern of at least one of the detected one or more ORUs. Such a measured gaze pattern can include, in some embodiments, the duration of a period of time during which the at least one of the detected one or more ORUs is looking at vehicle 100 immediately prior to a change in speed of vehicle 100.

At block 540, detection module 220 measures the speed at which the at least one of the one or more detected ORUs is moving by analyzing sensor data from sensor system 120 of vehicle 100, by analyzing sensor data or speed measurements received via network 190 from one or more connected vehicles in the vicinity of the ORU, by receiving via network 190 sensor data or explicit speed measurements from a device (e.g., a smartphone or smartwatch) associated with the ORU, or by a combination of these techniques. Once the speed of the at least one of the one or more ORUs has been determined, detection module 220 can determine the relative speed between vehicle 100 and the ORU.

At block 550, detection module 220 determines or estimates the age of the at least one of the one or more detected ORUs. As discussed above, in some embodiments, detection module 220 can explicitly receive an ORU's age from a device (e.g., a smartphone or smartwatch) associated with the ORU, if the ORU has opted to share such information with ORU notification system 170 for safety purposes. In other embodiments, detection module 220 can estimate a person's age by analyzing the ORU's appearance, posture, and/or gait from sensor data (images, video, etc.).

At block 560, detection module 220 estimates the emotional state of the at least one of the one or more detected ORUs. As discussed above, detection module 220 can do this by analyzing the ORU's facial expressions, posture, gait, and/or biometric data (pulse, etc.). Such biometric data can, in some embodiments, be obtained from a device (e.g., a smartphone or smartwatch) associated with the ORU, if the ORU has opted to share such data with ORU notification system 170 for safety purposes.

At block 570, perception module 230 determines a lag time, relative to the commencement of a change in speed of vehicle 100, that coincides with an estimated moment at which the at least one of the one or more ORUs perceives the change in speed. As discussed above, perception module 230 can determine the lag time based on one or more factors such as the initial speed of vehicle 100 immediately prior to the commencement of a change in speed, the measured gaze patterns of the at least one of the one or more ORUs, the speed at which the at least one of the one or more ORUs is moving, the determined or estimated age of the at least one of the one or more ORUs, and the estimated emotional state of the at least one of the one or more ORUs.

At block 580, signaling module 240 outputs a signal from signaling subsystem 280 in accordance with the lag time to notify the at least one of the one or more other road users of the change in speed of vehicle 100. As discussed above, the signal can take on a variety of different forms, depending on the embodiment (e.g., lights of various types, audible sounds, or both).

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with ORUs, or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and/or orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110, the ORU notification system 170, and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 either independently or in combination with the ORU notification system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-5, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for notifying other road users of a change in speed of a vehicle, the system comprising:
   one or more sensors to output sensor data;
   a signaling subsystem;
   one or more processors; and
   a memory communicably coupled to the one or more processors and storing:
      a detection module including instructions that when executed by the one or more processors cause the one or more processors to:
         detect, from the sensor data, one or more other road users; and
         measure, from the sensor data, a gaze pattern of at least one of the one or more other road users;
      a perception module including instructions that when executed by the one or more processors cause the one or more processors to determine, based at least in part on the measured gaze pattern, a lag time between a commencement of the change in speed of the vehicle and an estimated moment at which the at least one of the one or more other road users perceives the change in speed of the vehicle; and
      a signaling module including instructions that when executed by the one or more processors cause the one or more processors to output a signal from the signaling subsystem at a time that, relative to the commencement of the change in speed of the vehicle, is delayed by the lag time to notify the at least one of the one or more other road users of the change in speed of the vehicle.

2. The system of claim 1, wherein the perception module includes instructions to determine the lag time based, at least in part, on an initial speed of the vehicle immediately prior to the commencement of the change in speed of the vehicle.

3. The system of claim 1, wherein the measured gaze pattern includes a duration of a time period during which the at least one of the one or more other road users is looking at the vehicle.

4. The system of claim 1, wherein the detection module includes further instructions to measure, from the sensor data, a speed at which the at least one of the one or more other road users is moving and the perception module includes instructions to determine the lag time based, at least in part, on the measured speed.

5. The system of claim 1, wherein the signaling subsystem includes at least one of one or more lights and one or more devices that produce audible sounds.

6. The system of claim 5, wherein the one or more lights are one or more of solid, flashing, animated, and colored.

7. The system of claim 1, wherein the signaling module includes instructions to output a first version of the signal, when the change in speed of the vehicle is acceleration, and to output a second version of the signal that differs from the first version of the signal, when the change in speed of the vehicle is deceleration.

8. The system of claim 1, wherein the one or more other road users include one or more of a pedestrian and a cyclist.

9. A non-transitory computer-readable medium for notifying other road users of a change in speed of a vehicle and storing instructions that when executed by one or more processors cause the one or more processors to:
   receive sensor data from one or more sensors;
   detect, from the sensor data, one or more other road users;
   measure, from the sensor data, a gaze pattern of at least one of the one or more other road users;
   determine, based at least in part on the measured gaze pattern, a lag time between a commencement of the change in speed of the vehicle and an estimated moment at which the at least one of the one or more other road users perceives the change in speed of the vehicle; and
   output a signal from the vehicle at a time that, relative to the commencement of the change in speed of the vehicle, is delayed by the lag time to notify the at least one of the one or more other road users of the change in speed of the vehicle.

10. The non-transitory computer-readable medium of claim 9, wherein the instructions cause the one or more processors to determine the lag time based, at least in part, on an initial speed of the vehicle immediately prior to the commencement of the change in speed of the vehicle.

11. The non-transitory computer-readable medium of claim 9, wherein the measured gaze pattern includes a duration of a time period during which the at least one of the one or more other road users is looking at the vehicle.

12. A method of notifying other road users of a change in speed of a vehicle, the method comprising:
   receiving sensor data from one or more sensors;
   detecting, from the sensor data, one or more other road users;
   measuring, from the sensor data, a gaze pattern of at least one of the one or more other road users:
   determining, based at least in part on the measured gaze pattern, a lag time between a commencement of the change in speed of the vehicle and an estimated moment at which the at least one of the one or more other road users perceives the change in speed of the vehicle; and
   outputting a signal from the vehicle at a time that, relative to the commencement of the change in speed of the vehicle, is delayed by the lag time to notify the at least one of the one or more other road users of the change in speed of the vehicle.

13. The method of claim 12, wherein the determining the lag time is based, at least in part, on an initial speed of the vehicle immediately prior to the commencement of the change in speed of the vehicle.

14. The method of claim 12, wherein the measured gaze pattern includes a duration of a time period during which the at least one of the one or more other road users is looking at the vehicle.

15. The method of claim 12, further comprising one of determining and estimating an age of the at least one of the one or more other road users, wherein the determining the lag time is based, at least in part, on the age.

16. The method of claim 12, further comprising estimating an emotional state of the at least one of the one or more other road users, wherein the determining the lag time is based, at least in part, on the estimated emotional state.

17. The method of claim 12, wherein the vehicle is operating in an autonomous driving mode.

* * * * *